United States Patent [19]

Berube et al.

[11] 3,975,595

[45] Aug. 17, 1976

[54] SERVICE CODE CONVERSION

[75] Inventors: James E. Berube, Shortsville;
Gunter F. Neumeier, Rochester,
both of N.Y.

[73] Assignee: Stromberg-Carlson Corporation,
Rochester, N.Y.

[22] Filed: Nov. 25, 1974

[21] Appl. No.: 526,776

[52] U.S. Cl. .......................... 179/18 BA; 179/18 ET
[51] Int. Cl.² ........................................ H04M 3/42
[58] Field of Search ...................... 179/18 B, 18 BA

[56] References Cited
UNITED STATES PATENTS 3,692,946 12/1970 Budrys ............................. 179/18 BA

*Primary Examiner*—William C. Cooper
*Attorney, Agent, or Firm*—William F. Porter, Jr.

[57] ABSTRACT

A method of service code conversion and a service code conversion control circuit are disclosed for translating a dialed service access code in an abbreviated form into the directory number of a line circuit. A class-of-service indication assigned to a calling line circuit and a dialed abbreviated service access code are steered from a common register to a first translation circuit normally providing outgoing routing information for trunk marking. Instead of providing outgoing routing information, the first translation circuit or translator is strapped to recognize the class-of-service indicator and abbreviated dialed access code to enable a service code conversion control circuit. The service code conversion control directs the first translator to perform a conversion of the access code to a type of call indicator and a directory number, both of which are returned to the common register. A second translation circuit is enabled by the converted information which was returned to the common register and thereafter seizes a line circuit corresponding to the stored directory number and having a special service station terminated thereat.

10 Claims, 8 Drawing Figures

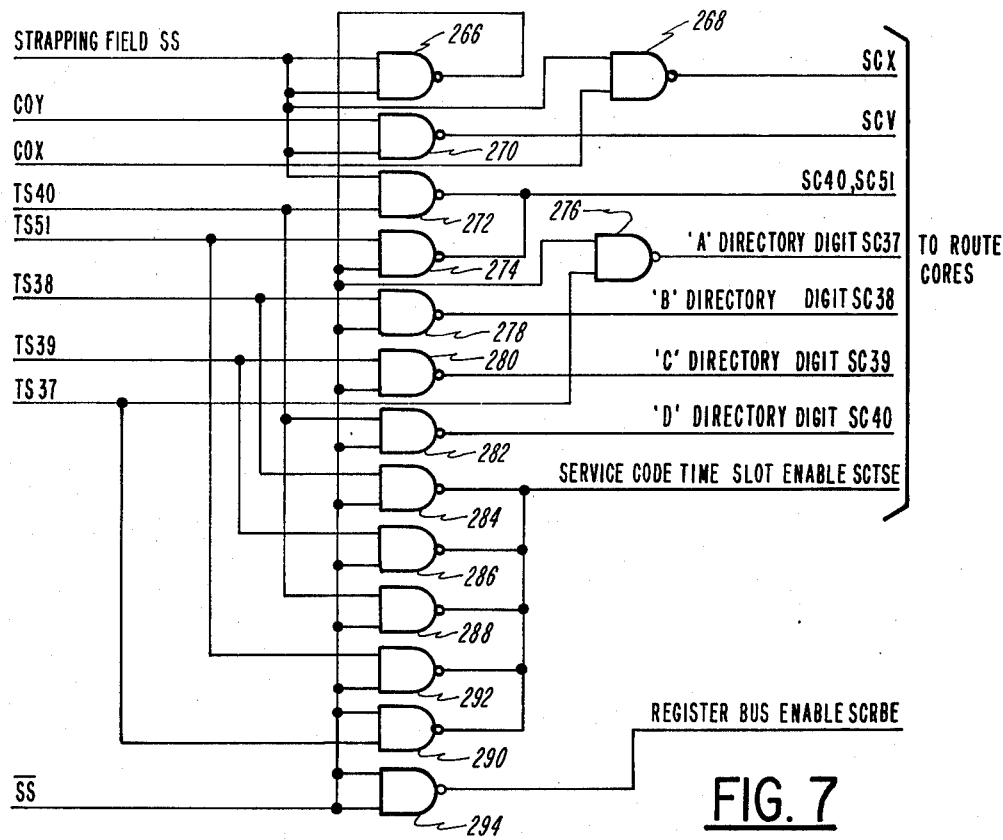

FIG. 7

| REGULAR | | | | | | SERVICE CODE | |
|---|---|---|---|---|---|---|---|
| | ASSIGNMENT | CONTROL SIGNAL | \multicolumn{4}{c}{AD3} | ASSIGNMENT | CONTROL SIGNAL |
| | | | A | B | C | D | | |
| 1 | COS X | COX | 1 | 0 | 0 | 0 | | |
| 2 | COS Y | COY | 0 | 1 | 0 | 1 | | |
| 3 | TRUNK GROUP TENS | T6T | 0 | 0 | 1 | 1 | | |
| 4 | TRUNK GROUP UNITS | T6U | 1 | 0 | 0 | 0 | | |
| 5 | TOC | T40 | 0 | 1 | 0 | 0 | TOC | SC51 |
| 6 | ROUTE DIGIT A | T55 | 1 | 1 | 0 | 0 | DIRECTORY DIGIT A | SC37 |
| 7 | ROUTE DIGIT B | T56 | 1 | 0 | 1 | 0 | DIRECTORY DIGIT B | SC38 |
| 8 | ROUTE DIGIT C | T57 | 1 | 1 | 1 | 0 | DIRECTORY DIGIT C | SC39 |
| 9 | MISCELLANEOUS | T41,T58 | 0 | 0 | 0 | 1 | DIRECTORY DIGIT D | SC40 |
| 10 | DIGIT EXPECT | T60,T17 | 0 | 0 | 1 | 0 | | |
| 11 | DIGITS SKIP | T61 | 1 | 0 | 1 | 1 | | |
| 12 | OUTPULSE MODE | T62 | 0 | 1 | 1 | 0 | | |
| 13 | MISCELLANEOUS | T64 | 1 | 1 | 0 | 1 | | |

FIG. 8

SERVICE CODE CONVERSION

BACKGROUND OF THE INVENTION

The invention relates in general to automatic telephone systems, and more particularly to a system for providing the special routing of service calls by a code translation in a private automatic branch exchange (PABX).

Prior art PABX systems generally have a number of special features associated with their operation. One of the features common to the art has been the provision for abbreviated access in connection with certain business functions.

In particular this feature has been used in hotels, motels, and similar businesses to simplify the means by which a guest may be connected to various special services provided in that facility. Generally, a list of codes corresponding to the special services which a guest may procure, such as maid service, room service, swimming pool, dining room, and others, is attached to his station.

The guest may obtain any of the services listed by dialing one of the service access codes from his station and waiting for the PABX to connect him to the corresponding special service station. Therefore, to facilitate recollection of the special service codes and the use of the services, it is important that the codes be uniform throughout the facility and as simple as possible (abbreviation to one digit is preferred).

Also, in a large complex of buildings, wherein each building may have its own special services, it is desirable to insure that a guest occupant of one building attempting to contact a special service will be automatically routed to the special service station in his building, rather than that service in another building of the complex.

To accomplish the preceding objects, one prior art common control telephone system uses dual translation circuits for connecting subscriber stations dialing service access codes to the desired service stations. The system provides a number translator circuit for marking line circuits connected to a line link network and a code translator circuit for marking trunk circuits connected to a trunk link network. The number translator circuit performs the dual function of converting dialed directory numbers into an equipment location of a line circuit as well as converting an equipment number of a line circuit into a directory number. The code translation circuit on the other hand converts central office prefixes, area code, and the special services codes into routing information for seizing a trunk marker to mark circuits connected to a trunk link network outlet. The system then provides for the connection of the subscriber station, marked by the number translator, through the line link network to a special service station on the trunk link network, marked by the code translator.

Although this system establishes special service code connections in an advantageous and reliable manner, a separate trunk circuit is needed for each special service code station. Such trunk circuits are relatively more expensive than line circuits and also take up a separate outlet on the trunk link network.

The outlets on the trunk link network generally should be reserved for common connecting circuitry such as outgoing trunks and ringing controls that may be used by all line circuits and not for terminating single special service stations. Thus, the special service stations would be more efficiently accessed if available through commonly connectable circuitry than through an expensive dedicated trunk circuit and trunk link network outlets.

SUMMARY OF THE INVENTION

The invention provides an improved method for efficiently connecting special service calls by means of a special service conversion control circuit directing a service access code conversion. The method includes dialing an abbreviated service access code into one of a plurality of common registers from a calling line, storing a class-of-service indication in the same register, transferring the access code and COS indicator to a first translation circuit, decoding the transferred indicator and access code into a service code signal, translating the abbreviated code into a directory number and type of call indicator under the direction of the service control circuit, storing the directory number and type of call indicator in the common register, marking a line circuit corresponding to the directory number under the direction of a second translation circuit to which the stored directory number and type of call indicator have been transferred, and connecting the calling line to the marked line circuit having a special service station attached thereto.

The invention further provides a service control circuit for directing the translation of the abbreviated service codes into directory numbers.

The service control circuit includes means for sensing a service access code and the corresponding class-of-service indicator and for generating a service code signal upon the receipt thereof. The service code signal enables gating circuit means which direct a plurality of routing cores of the first translation circuit to output a type of call indicator and directory number to a register output bus. The service code signal developed by the sensing means also enables the register output bus for transmission of the translated information back to a common register.

Accordingly, it is an object of the present invention to conserve relatively scarce trunk link network outlets and expensive trunk circuits when connecting special stations. The object is accomplished by the present invention according to which an advantageous method is provided by which a plurality of special service stations are connected to line circuits rather than trunk circuits.

These and other objects, features and advantages of the present invention will become more apparent from the following detailed description when viewed in conjunction with the following drawings wherein:

BRIEF DESCRIPTION OF THE DRAWINGS

FIG. 7 is a schematic wiring diagram of the service code control circuit of the telephone switching system illustrated in FIG. 1; and FIG. 8 is a graphic representation of the control and timing signals of the code translator circuit illustrated in FIG. 2.

DESCRIPTION OF THE PREFERRED EMBODIMENT

Figure 1:
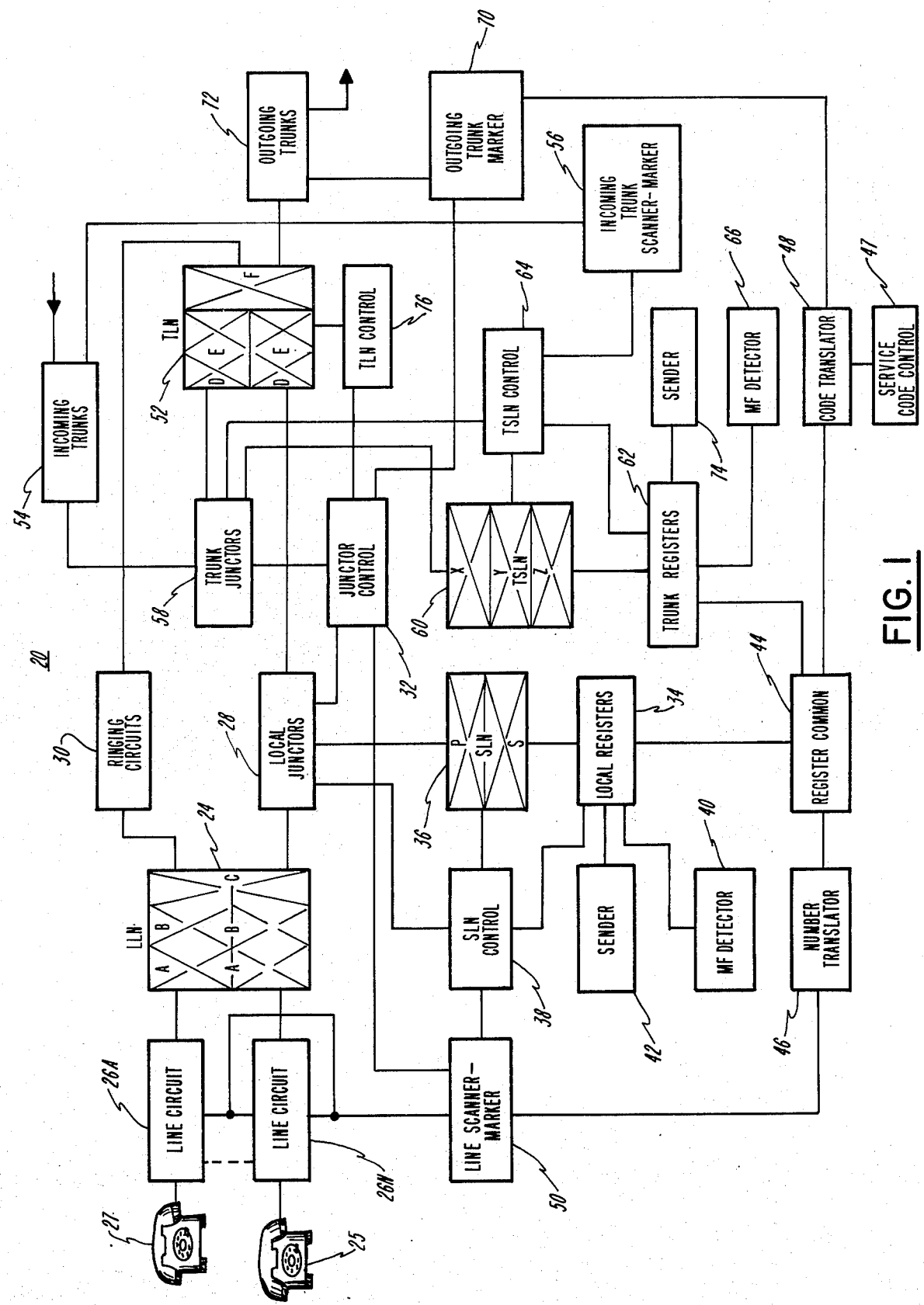
FIG. 1 is a system block diagram of a common control telephone switching system including a special service control circuit constructed in accordance with the present invention.

Referring now to FIG. 1, there is shown a block diagram of a common control telephone system, generally designated 20, including a service code conversion system constructed in accordance with the invention.

Common control switching system 20 includes a line link network (LLN) 24 which functions as a concentrator for originating line calls and as a fan-out for terminating calls. The LLN, comprising three stages of matrices (A, B and C), is used for both originating and terminating types of traffic and is connected at one end to a plurality of line circuits 26A–26N, which vary in number depending upon the telephone service to be offered.

Line circuits 26A–26N are more fully described in U.S. Pat. No. 3,708,627, entitled "Plug-In Line Circuit Arrangement", issued on an application filed on June 15, 1971, in the name of Otto Altenburger and assigned to the assignee of the present invention, the disclosure of which is incorporated herein by reference.

A station set 25 connected to the line circuit 26N may be located at any of the guest facilities provided by a business and a station set 27 connected to the line circuit 26A may be located at any of the plurality of special service locations in the same business.

LLN 24 provides a unique path between circuits connected to opposite ends of the network. Each of the switching networks in FIG. 1 includes matrix switches consisting of relays, each having a mark or control winding for initially actuating the relay and a hold or sleeve coil connected in series with its own contacts for maintaining the relay in an actuated condition after a path through the network has been established.

The C stage of LLN 24 provides the termination for both originating traffic from line circuits 26A–26N and incoming traffic to the line circuits. These terminations of LLN 24 are connected to local junctors 28 for originating traffic and to ringing controls 30 for terminating traffic. The number of local junctors and ringing controls provided depends upon traffic requirements for this system.

The ringing controls are more fully described in U.S. Pat. No. 3,671,678, entitled "Ringing Control Circuit", issued on an application filed on Dec. 22, 1970, in the name of Otto Altenburger and assigned to the assignee of the present invention, the disclosure of which is incorporated herein by reference.

Local junctor circuits 28 and their control (by junctor control 32) are more fully described in U.S. Pat. No. 3,705,268, entitled "Passive Junctor Circuit and Selectively Associated Junctor Control", issued on an application filed on Dec. 22, 1970, in the name of Otto Altenburger and assigned to the assignee of the present invention, the disclosure of which is incorporated herein by reference.

Local junctors 28 serve as a focal point for all originating type traffic, including provisions for connecting the line circuits 26A–26N to a plurality of local registers 34 via a service link network (SLN) 36 and provisions for providing transmission battery for calling and called parties on intra-office calls and are under the control of the calling party. When trunk or station busy conditions are encountered, the local junctors 28 provide the busy tone to the calling party.

Service link network 36 includes two stages of matrices (P and S) and is controlled by a SLN control circuit 38 for connecting the calling line circuits 26A–26N (via one of the local junctors 28) to one of the plurality of local registers 34 which, when connected to local junctors 28, provide dial tone and include apparatus for acting on the instructions of the subscriber. Local junctors 28 terminate at the S stage. The dial pulse acceptors function as an interface between local junctors 28 and the local registers 34. The dial pulse acceptors (DPA's) provide the dial tone to the calling subscriber and also detect rotary dial pulses and extend the pulses to storage sections in local registers 34. In the event of multifrequency signalling by the subscriber, the frequencies are detected by MF detectors 40 connected to dial pulse acceptors.

The local registers 34 include a DPA, register storage and register output and are connected to a sender 42 for providing outpulsing. The registers and senders are controlled by a register common 44 which contains the necessary control units. Local registers 34 are connected to the register common 44 on a time division multiplex basis wherein information is passed from one piece of equipment to another on a common bus. Register common 44 is also connected to communicate with a number translator 46 and a code translator 48 on a time division multiplex basis. The translation circuits provide information, such as directory number, equipment number, ringing code, routing information and class-of-service (COS). The number translator 46 is connected to a line scanner-marker circuit 50 which has the means to detect service requests and means to access the individual line circuits 26A–26N. The code translator 48 is connected to trunk marker-scanners 56, 70 which have means to detect service requests and means to access any of a plurality of outgong trunks 72.

The ringing controls 30 connect ringing generators to terminating or called stations, detect off-hook conditions (ring-trip) of the called station and provide ringback tone for the calling station. Each line circuit 26A–26N can be connected to a plurality of ringing controls which are accessed from a trunk link network (TLN) 52 so that a ringing control is automatically connected to the terminating line circuit as soon as a connection to that line is complete.

The line scanner circuit 50 continuously checks line circuits 26A–26N for an off-hook condition. Line scanner-marker circuit 50 is also used for both the originating and terminating types of traffic. In the event of originating traffic, the line scanner stops when an off-hook condition is detected and transmits the information from its counter circuits to a marker circuit to mark the particular line circuit 26A–26N and enables the SLN control 38 to initiate a path finding operation between an available local register 34 and the line circuit requesting service. In the event of terminating traffic, line scanner 50 is controlled by the number translator 46 and receives an equipment number from the number translator 46 to mark the line circuit 26A–26N with the particular equipment location and in addition, in terminating traffic, the line marker 50 also transmits the terminating subscriber classes of service, ringing code, busy or idle status and types of ringing required through junctor control 32 to ringing control 30.

The line scanner-marker circuit 50 is more fully disclosed in U.S. Pat. No. 3,699,263, entitled "Line Scanner And Marker Using Group Scanner", issued on an application filed on Dec. 23, 1970, in the names of Gunter Neumeier and Otto Altenburger and assigned to the assignee of the present invention, the disclosure of which is incorporated herein by reference.

In operation, when a calling telephone goes off-hook, the line scanner-marker 50 detects the off-hook condition and marks the line circuit connection to the A stage of the LLN 24. Simultaneously, the line scanner-marker circuit 50 signals the SLN control 38 to begin a path finding process for connecting the marked line circuit to one of the local registers 34. The SLN control 38 detects and locates a path in a three step scanning process. During the first scan, the existence of a free path between a free local register 34 and the line circuit is located and the free local register 34 and its corresponding stages S matrix module is identified. During the second scan, a free path through a P stage matrix module is identified. Finally, during the third scan, a free local junctor 28 is identified. The connection of the local junctor 28 to the LLn 24 and the connection through the SLN 36 are now completed.

When path finding is complete, the relay coils of the selected matrix in the LLN 24 and the SLN 36 are energized. The metallic connections through the tip and ring leads are checked, and, if the connection is complete, the sleeve coil connections are effected and the connected local junctor 28 is seized. At this time, the SLN control 38 and the line scanner-marker circuit 50 are released, and the local register 34 is connected to the subscriber to receive dialed information. Once the subscriber information has been dialed into a local register 34, the call must be routed either internally to another local subscriber or externally to a central exchange.

Incoming calls from a central exchange are applied to one of a plurality of incoming trunk circuits 54. Incoming trunk scanner-marker circuit 56 continuously scans the incoming trunk circuits 54 for a seized incoming trunk and, when such a seized trunk is located, a scanner circuit stops and transmits the trunk equipment number to a marker circuit, identifying the particular incoming trunk circuit 54. The identified incoming trunk circuit 54 is connected to a trunk junctor 58 (which is essentially identical to a local junctor 28, but is connected between the incoming trunk circuit 54, the TLN 52 and a trunk service link network - TSLN 60). The trunk junctor 58, which functions as a focal point for all incoming traffic, includes provisions for connecting the incoming trunk circuit 54 to any one of a plurality of trunk registers 52 via the TSLN 60, provides incoming and called parties with transmission battery and, when encountering either trunk or station busy conditions, returns a busy tone to the incoming call.

A TSLN control 64 is provided and is arranged to locate a path between trunk junctors 58 and trunk registers 62. Trunk junctors 58 are terminated on the X stage matrix modules of TSLN 60 and trunk registers 62 are terminated on the Z stage matrix modules. TSLN 60 is divided into a number of separate grids. The incoming trunk scanner-marker circuit 56 signals the TSLN control 64 which of the grids will be used for accessing one of the trunk registers 62 as determined by the trunk junctor 58 involved in the connection. Trunk registers 62 include a dial pulse acceptor interface and subcircuits including a register storage and registers output. A multifrequency detector 66 is also connected to the trunk registers 62. The subcircuits in the trunk register 62 and the multifrequency detector 66 are controlled by register common 44 on a time division multiplex basis. The register common 44 is connected to communicate with number translator 46 and code translator 48 on a time division basis. Code translator 48 is connected to an outgoing trunk marker circuit 70 and is arranged to identify outgoing trunks 72.

The outgoing trunk marker circuit 70 is more fully explained in U.S. Pat. No. 3,732,377, entitled "Outgoing Trunk Marker", issued on an application filed on Dec. 31, 1970, in the names of Otto Altenburger and David Stoddard and assigned to the assignee of the present invention, the disclosure of which is incorporated herein by reference. A sender circuit 74 is also connected to the trunk register 62 to provide outgoing pulsing.

Since the trunk junctors 58 are identified by the incoming trunk scanner-marker circuit 56, only a two step scan is required in the path finding scheme of the TSLN control 64. During the first scan a free path between a free trunk register 62 and the seized trunk junctor 58 is located, the free trunk register 62 is identified and marked and the connected Z stage module is identified. During the second scan, a free path through the X and Y stage matrix modules to the marked trunk junctors 58 is located, the mark relay coils through the Y and Z stage matrix modules are energized and the mark relay coils through the Z stage matrix modules to the marked trunk register 62 are energized. When the connection between the trunk junctors 58 and the trunk registers 62 is completed, the metallic connections through the tip and ring leads are checked and the sleeve connections are completed. The TSLN control 64 and the incoming trunk marker 56 are then released. When the incoming information has been received by one of the trunk registers 62, the call is either routed internally to a local subscriber or externally to a central exchange via one of the outgoing trunks 72.

The TLN 52 is arranged to provide for termination of local traffic to local subscribers, termination of incoming calls from other exchanges to local subscribers and connections of incoming calls from external exchanges to other external exchanges. The TLN 52 includes D and E stage matrix modules and, when further expansion is required, an F stage matrix module. The D stage provides an entrance to the TLN 52 and is connected to the local junctors 28 and to the trunk junctors 58. The exit from the TLN 52 is provided by the F stage which is connected via the ringing circuits 30 to the LLN 24 and to the outgoing trunks 72.

A TLN control 76 and the junctor control 32 provide path finding through the TLN 52 for both internally terminated calls and outgoing calls to a distant office. The number translator 46 and the line scanner-marker 50 are utilized to complete calls to local lines, and the code translator 48, together with the outgoing trunk marker 70, are utilized to complete calls to trunks. The path finding operation of the TLN control 76 includes a two step scan. A local junctor 28, or a trunk junctor 58, has been previously marked (depending upon whether the call being terminated is an incoming call or a locally generated call). In addition, the information in the local or trunk register is transmitted from the register via the register common 44 to either the number translator 46 or the code translator 48 (again depending upon whether the call is being terminated to a local subscriber or to a distant exchange, respectively). In the event of a call terminating to a local subscriber, the number translator 46 marks the line circuit of the terminating call via the line scanner-marker circuit 50. In the event of an outgoing call, the code translator 48 marks the particular outgoing trunk group 72 via the outgoing trunk marker circuit 70. The first scanner of the TLN control 76 detects a free path through the TLN 52 either to the marked outgoing trunk 72 or via a ringing circuit 30 and the LLN 24 to a line circuit 26A–26N and identifies the E stage matrix module (the D stage matrix module is previously identified by the seized local or trunk junctor). The second scan identifies and marks the input to the F stage matrix module, completes the connection back through the D and E stage matrix modules to the marked junctor by energizing the matrix mark relay coils and also provides power through the F stage module and the LLN 24 to energize the mark relay coils. After a metallic path check is made via the tip and ring leads, the sleeve connections are picked up to complete the connection through the TLN 52.

The ringing control 30 now rings the called party. The connections through the LLN 24 and the TLN 52 and the local or trunk junctors 28 or 58 are maintained during the call under the control of the calling party. When the calling party hangs up, all connections are broken. Should the calling party still remain off-hook after the called party hangs up, provisions are included in the junctor circuits to break the connections after a predetermined period of time.

The interconnection and operation of the common control switching system are more fully described in U.S. Pat. No. 3,729,593, entitled "Path Finding System", issued on an application filed on June 15, 1971, in the names of Otto Altenburger and Robert Bansemir and assigned to the assignee of the present invention, the disclosure of which is incorporated herein by reference.

In prior art systems, when a service code call is connected to a system with a dual translation capability as the one described above, the calling party dials the service access code from a station 25 into the local register 34 via the SLN 36. The register common 44 recognizes the abbreviated dial code and steers it to the code translator 48 during its time divided access.

The register common 44 performs the steering function for the dialed digits to either the number translator 46 or the code translator 48 by assigning a type of call indicator that may be passed to each circuit together with the digits. The register common 44 decodes the first three digits of the dialed information stored in a local register 34 to produce the required type of call indicator.

Abbreviated codes (less than four digits) are steered to the code translator 48, since the number translator 46 requires a full directory number for translation. If less than a full directory number were steered to the number translator 46 logical confusion would result as to which number of a block (abbreviated code AXXX, ABXX, ABCX) the register common 44 desired to be marked.

The code translator 48 then translates the service access code into routing information and seizes the outgoing trunk marker 70 to mark an outgoing trunk circuit 72 connected to one of the outlets of the TLN 52. The TLN control 76 is then seized to path find a free path between the local junctor 28 and the outgoing trunk 72 through the TLN 52. Special service code stations then may be connected to any of the outgoing trunk circuits in this manner. As mentioned before, however, this is inefficient as the trunk circuits are relatively expensive and TLN outlets are relatively scarce.

Once the service code has been translated into routing information, an efficient connection to a line circuit 26A cannot be made because the code translator 48 cannot access the line marker-scanner 50.

However, according to one of the objects of the invention, a service code control circuit 47 connected to the code translator 48 is provided and enabled by a service code entering the code translator 48. The service code control 47 controls the code translator 48 to translate the service access code into a directory number instead of a plurality of routing digits. The service code control 47 then enables the code translator 48 to output this translated directory number to the register common 44 where it may be stored in the local register 34 with a type of call indicator.

Upon the next addressing of the local register 34 by the register common 44, the number translator 46 recognizes the directory number and the type of call digit and seizes the line scanner-marker 50. The line scanner-marker 50 takes the equipment number from the number translator 46 and marks the desired special service station 27 connected to the line circuit 26A. The TLN control 76 is then seized to path find a connection between the local junctor 28, the TLN 52, a ringing circuit 30 and the LLN 24 to the connected special service station 27.

The service code control 47 thus permits efficient connection of a subscriber to a special service code station 27 and eliminates the need for connecting the special service code stations to an outgoing trunk circuit 72. Further, only the addition of the service code control circuit 47 to the existing switching system is required for performing the routing of special service calls. The service code control 47 uses an optimal number of the common control circuits already provided in the common control system 20.

Figure 2:
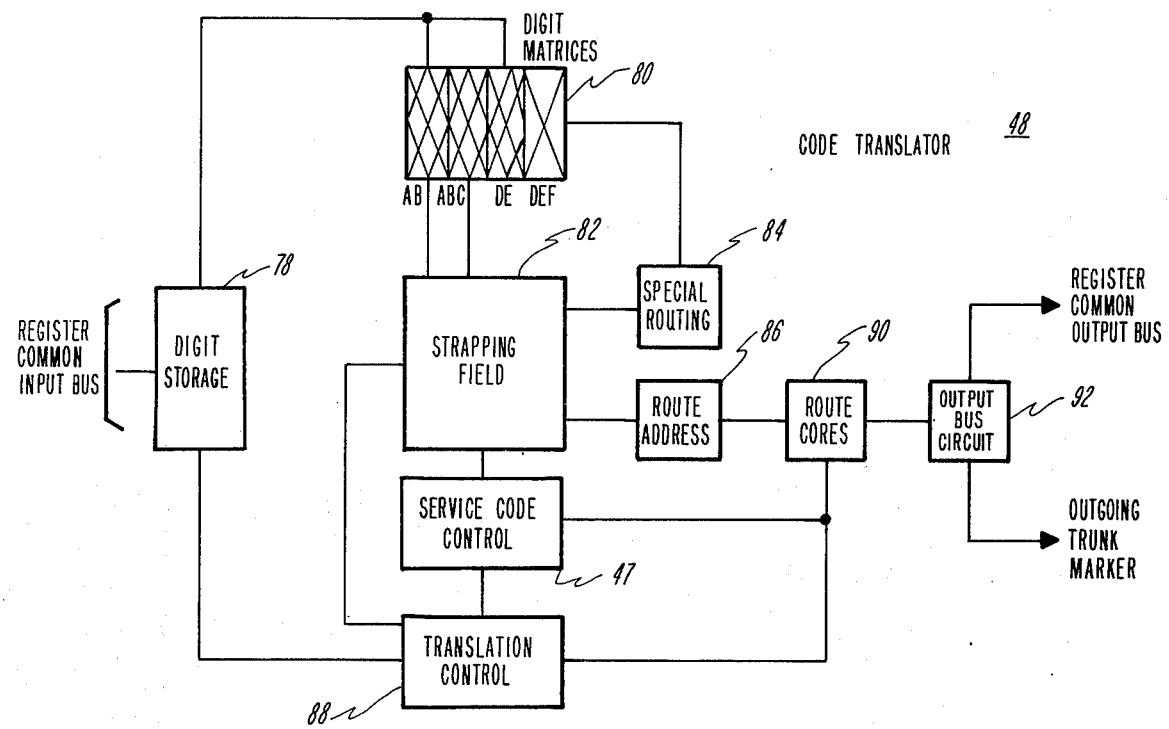
FIG. 2 is an expanded block diagram of the code translator circuit of the switching system illustrated in FIG. 1.

Referring now to FIG. 2, there is shown a detailed block diagram of the code translator 48 which is connected to a register common input bus for receiving dialed digits from the connected local registers 34. As digits enter the code translator 48, they are stored in a digit storage circuit 78 for transfer either to a translation control circuit 88 or to digit matrices 80. The digit matrices 80 combine and expand the digits stored in the storage circuit 78 and provide output signals to a strapping field 82 and to a special routing circuit 84. The output lines of the strapping field 82 are connected to a route address block 86 which has a number of windings or program wires connected through route cores 90 which, when energized or "enabled" by the translation control circuit 88, provide the translation of the output signals from the strapping field 82 (route addresses) into routing and control digits. The routing digits are supplied through an output bus circuit 92 and returned to the common register 44 or to the outgoing trunk marker 70 for control of the connection to the outgoing trunks 72.

The service code control circuit 47 is connected to an output of the strapping field 82 which decodes the service access codes from the output signals of the digit matrices 80 and enables the service code control 47 with a service control enable signal. The access codes are also strapped through the route address block 86 and thereby provide program wires to the route cores 90. When the service code control 47 is enabled, the control 47 provides control signals to translate the service codes into directory numbers at the correct time for return to the common register 44 via an output bus circuit 92.

Figure 3:
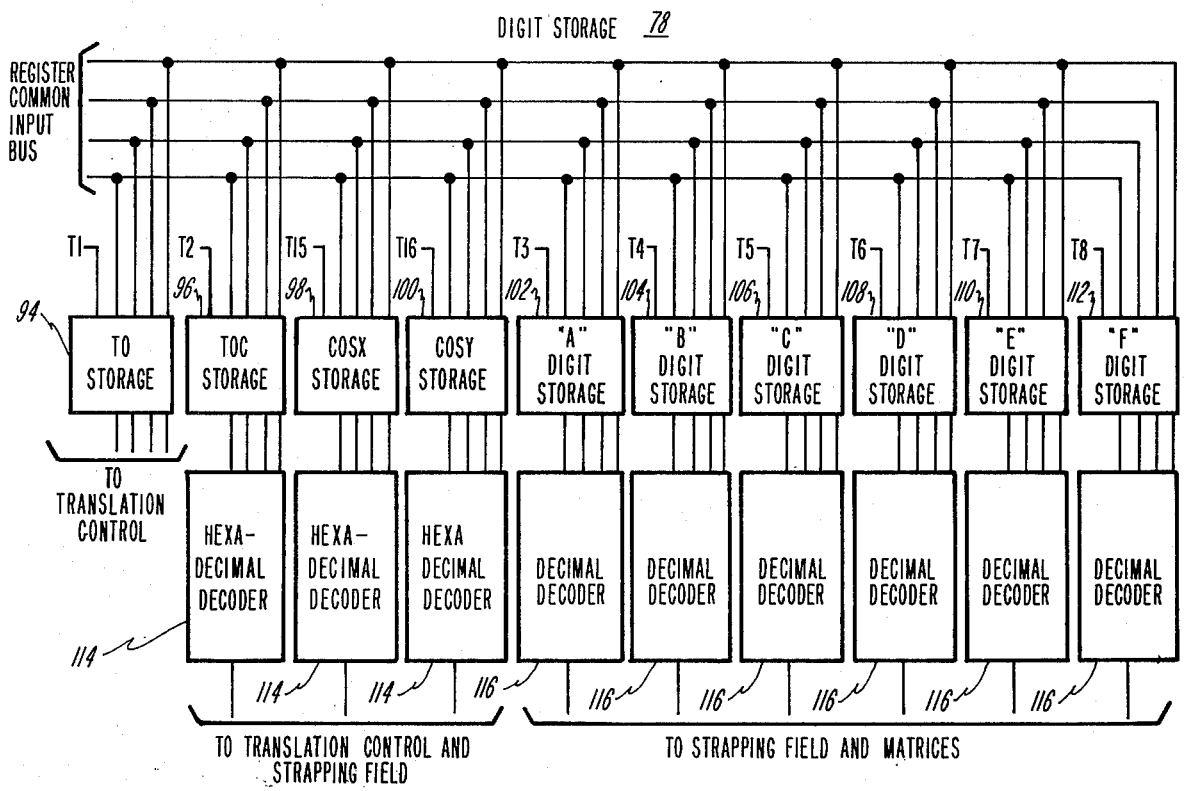
FIG. 3 is a diagram, partially in block and partially in schematic form, of the digit storage circuitry of the code translator illustrated in FIG. 2.

Referring now to FIG. 3, there is shown an expanded detailed block diagram of the digits storage circuit 78 connected to the register common input bus. Data from the local registers 34 are transferred via the register common 44 and register common input bus to the digits storage circuit 78 in digits of four bits each during selected time slots. Each digit is stored in a separate storage location 94-112 in the time slot during which it is transmitted by enabling the corresponding digits storage 94-112 coincidently therewith.

A time out digit is stored in time out storage circuit 94 at time slot T1 and a type of call digit may be stored in type of call storage circuit 96 at time slot T2. During the time slots T3-T8, up to six digits can be stored in A-F digit storage circuits 102 to 112. The abbreviated service codes are stored in one or more of the digit storages A-C and decoded by decoders 116 for transmission to the strapping field 82 and thereby enables the service control signal and program wires (as will be explained in greater detail below).

In addition, two class-of-service digits may be stored in class-of-service storage locations X and Y, 98 and 100, respectively, during time slots T15 and T16, respectively. Dialed digits A-F, normally representing a three digit area code and a three digit exchange code, are connected to decimal decoders 116 to decode the four bit digits into one of ten output lines from the output of the decoders 116. The outputs of the decoders 116 are then transmitted to the digit matrices 80 where they are combined and further expanded as explained above. The type of call digit and class-of-service digits X and Y are expanded to a one-out-of-sixteen line by hexadecimal decoders 114. The outputs of the hexadecimal decoders 114 are then transmitted either to the translation control circuit 88 or to the strapping field 82 to route the call either by the type of call digit or by the class-of-service digits. The time out storage digit is transmitted to the translation control circuit 88 for enabling the translation of the dialed digits.

Each calling subscriber line circuit 26N may have different combinations of the class-of-service indications COSX, COSY associated with it. The class-of-service digits COSX, COSY are used to route subscribers who dial identical special service codes to different locations in the same facility. This feature provides for the automatic routing of a subscriber to a special service facility in his own building in accordance with an object of the invention. The automatic routing is provided by expanding the number of program wires in the code translator 48 assigned to special service calls by decoding the class-of-service indicators coincidently with the decoding of the special service access codes in the strapping field 82. A plurality of program wires, each corresponding to the directory number of the special service locations in the facility, is established for routing special service codes in this manner.

Figure 4:
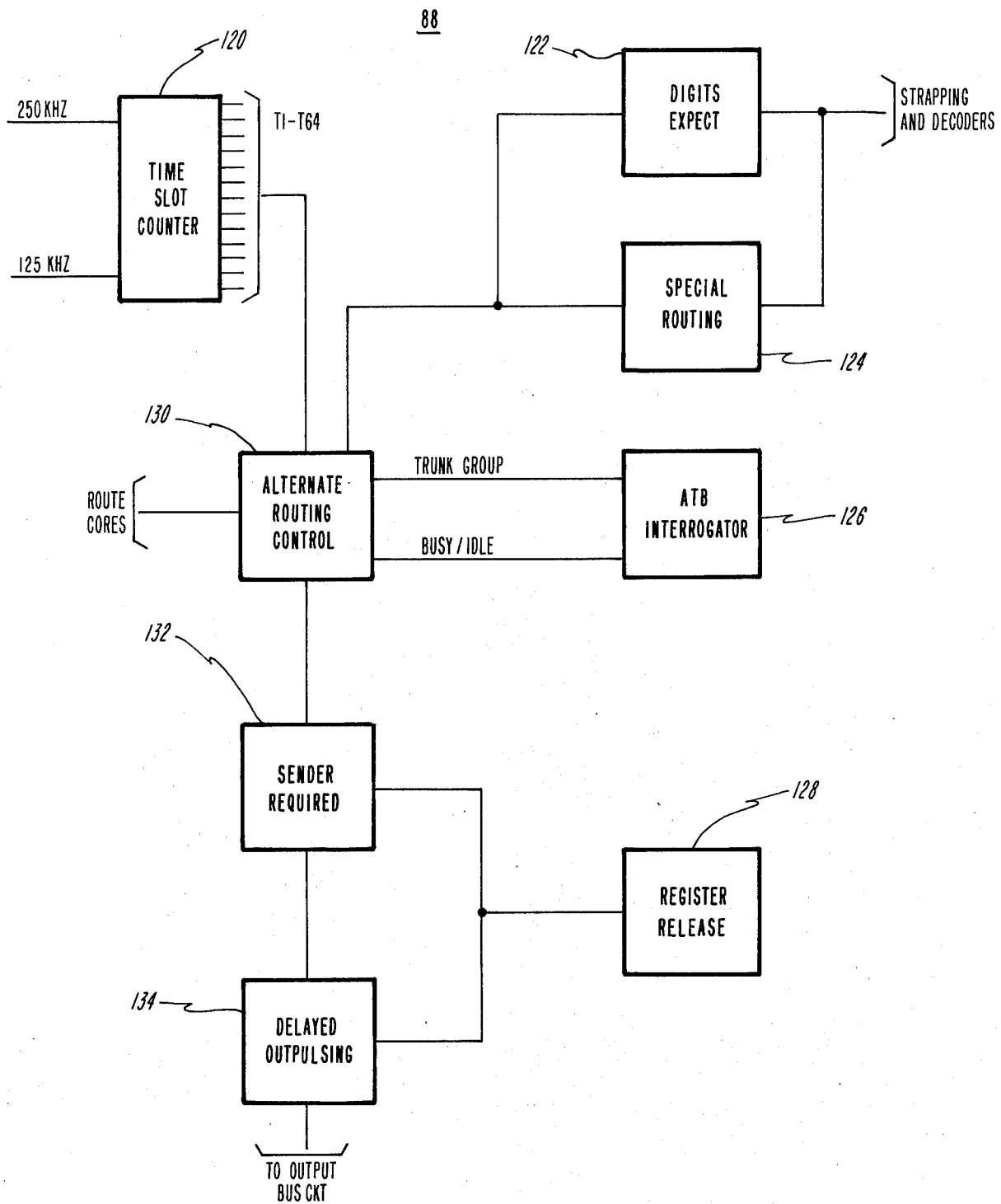
FIG. 4 is an expanded block diagram of translator control and logical translation circuitry of the code translator illustrated in FIG. 2.

Normally, enabling of a program wire by a combination of information starts the translation control circuit 88 illustrated in a detailed block diagram in FIG. 4. The translation control circuit 88 includes a time slot counter 120 which provides a plurality of time slot pulses T1-T64 to synchronize the operation of the translation control circuit 88 and other translation circuits. The translation control circuit 88 also includes a digits expected circuit 122 for establishing the number of dialed digits expected from a subscriber attempting to complete a termination, and a special routing circuit 124 for automatically handling routes needed for special situations, such as register timeout, critical timeouts, or paystation and WATS connection intercept.

In the event that a primary route does not have a free trunk, an alternate routing control circuit 130, provided in the translation control circuit 88, is arranged to select another program wire for routing the call via a secondary route. The alternate route control circuit 130 is arranged to interrogate individual trunk groups to ascertain the status of particular trunks by energizing an All Trunks Busy Interrogator circuit 126 and receiving, therefrom, a busy/idle reply. If the primary route is busy, a secondary route is interrogated in a similar manner until a free route is found. Up to three alternate routes are attempted before the call is automatically routed to equipment which provides a busy tone back to the calling party at the end of the dialing of digits into the register 34.

The selected route is now checked by a sender required circuit 132 in the translation control circuit 88 to determine if a sender 42 is required for the call. If a sender 42 is required, a sender busy/idle check is performed. If no sender is available, the register 34 is released by a register release circuit 128 in the translation control circuit 88. The next time the register common 44 gains access to the code translator 48 the entire process heretofore described will be repeated until a sender 42 is found to be idle or the register 34 times out.

When an idle sender 42 is seized, the translation control circuit 88 checks to determine if delayed outpulsing is necessitated via a delayed outpulsing circuit 134.

If delayed outpulsing is unnecesary, the call will be terminated via the selected route. When the delayed outpulsing circuit 134 determines the necessity for delayed outpulsing, the translation control circuit 88 checks the digits expected circuit 122 to compare the number presently dialed into the register with the number expected for the particular call. If the number of dialed digits equals the number expected, the call is completed and, if not, the register 34 is released to wait for additional dialing. The process will be repeated, at the time divided access for the register 34, until equality between dialed digits and digits expected are detected and the call is then completed. When the translator control circuit 88 completes a call, the output bus circuit 92 is enabled and the selected trunk group number is transmitted to the outgoing trunk marker 70. The outgoing trunk marker 70 marks the selected trunk so that a matrix path can be chosen connecting the calling party to the selected trunk group.

The service code control 47 bypasses the normal control sequence and provides a service code translation, as more fully described below.

Figure 5:
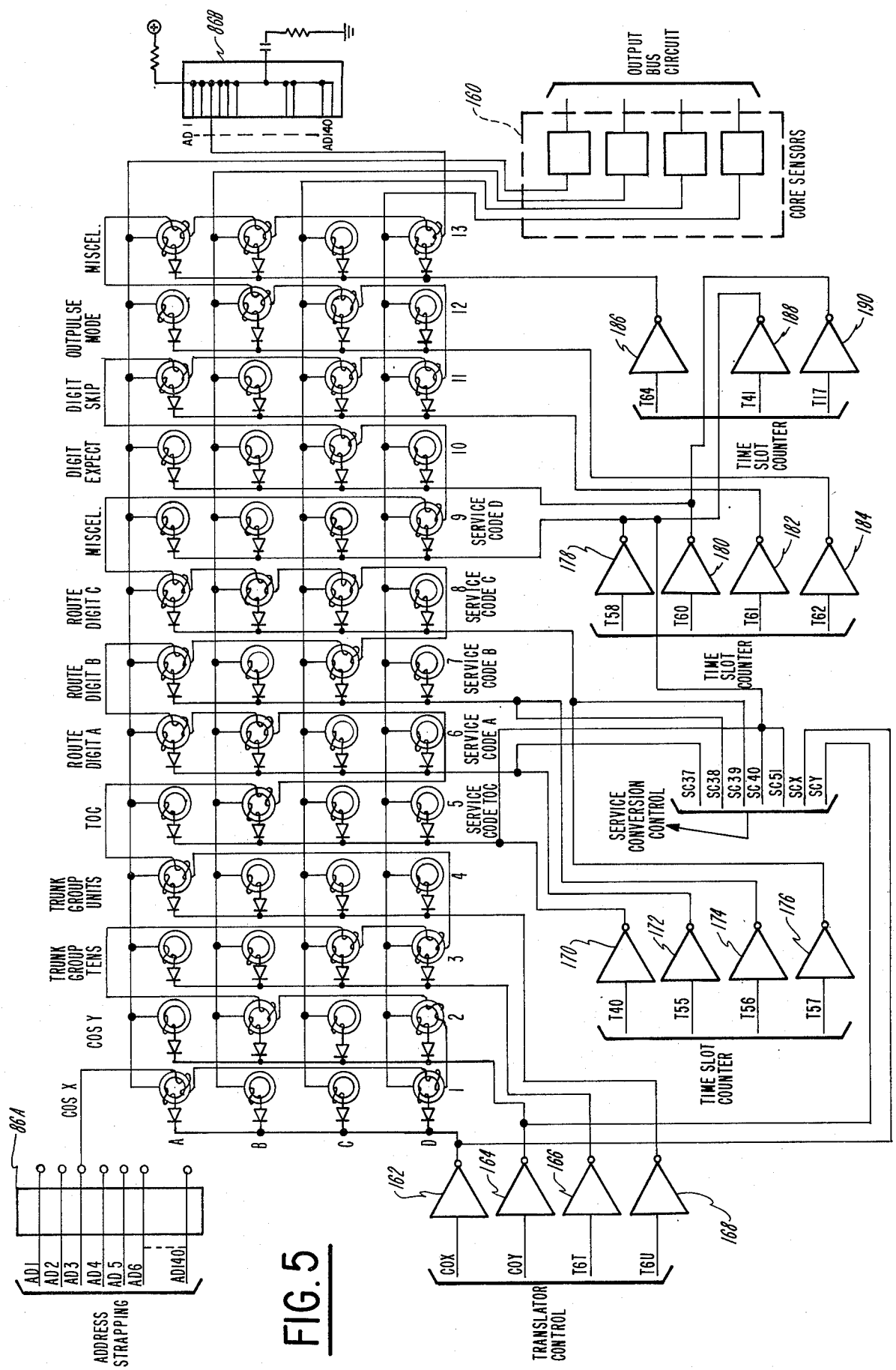
FIG. 5 is a schematic wiring diagram of the routing cores of the code translator illustrated in FIG. 2.

Turning now to FIG. 5, there is illustrated the route core matrix 90 having a plurality of rows A, B, C and D and columns 1-13, a plurality of address lines Ad1-140 or program wires, connected on one end to one-half of the address block 86a, and terminated on the other end at the other half of address block 86b, threaded through the cores of the matrix 90.

Each address line Ad1-140 can be wound through the route cores 90 to provide a translation for up to 140 different routes. Each column has a time slot driver 162-190 connected thereto for gating a particular time slot or control signal. The time slot drivers 162-190 are enabled at selected time slots by control signals from the translation control circuit 88 and, when an address line for a particular core is enabled coincidently with the signal from a time slot driver, an output digit will be sensed at the core sensors 160. In this manner, up to thirteen four bit digits may be outpulsed in up to 140 combinations to provide routing information for the common control telephone system.

For example, when the address line AD3 is enabled, the control signals will outpulse the programmed code illustrated in the table in FIG. 8.

As was mentioned above, a number of the address lines may be associated with the special service code control by means of the strapping field 82. The service conversion control circuit 47 further supplies driving signals SC37, 38, 39, 40 and 51 to generate a four digit directory number and a type of call digit, while disabling time slot drivers 162 and 164 during the presence of control signals SCX, SCY and disabling time slot driver 170 during control signal SC40.

Figure 6:
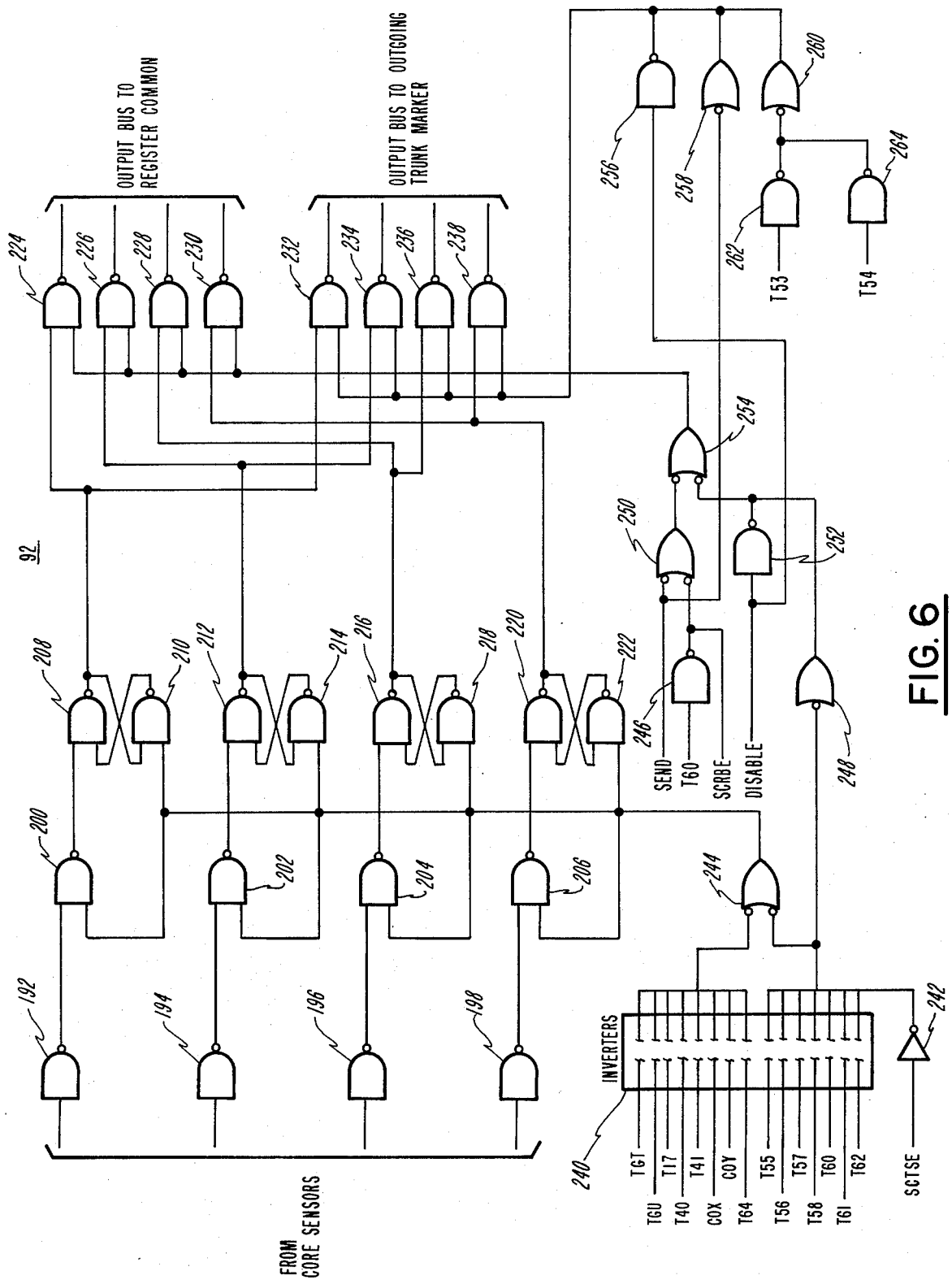
FIG. 6 is a schematic wiring diagram of the output bus circuit of the code translator illustrated in FIG. 2.

With reference now to FIG. 6, there is shown a detailed schematic diagram of the output bus circuit 92 which includes a plurality of input gates 192-198 connected to the output lines from core sensors 160. The pulses from the core sensors 160, set flip-flops 208-222 via enable gates 200-206, respectively, on the rising edge of the control signals. The rising edge of the control signals enable the gates 200-206 via inverters 240 and a gate 244. On the falling edge of the control signals the flip-flops are reset via the inverters 240 and the gate 244 to provide outpulsing either to a plurality of output gates 224-230 connected to the bus register common or a plurality of output gates 232-238 connected to the output bus to the outgoing trunk marker 70. The output gates 224-230 either are enabled by control signals transmitted via gates 246 through 254 or by the service code control circuit 47 which transmits a service code register bus enable signal (SCRBE) transmitted via gates 250, 254. The service code digits are transmitted in this manner after passing through the flip-flops 208-222 (enabled by service code time slot enable (SCTSE) signal via gates 242-244).

The service code control signals are generated by the service code control circuit 47 which is shown in FIG. 7. A service code enable line SS connected to the strapping field 82 transmits an enabling signal SS as a result of the decoding of all service access codes which are strapped to a single pin in the strapping field 82. The service enable signal SS is low when the service code control circuit 47 is ready to be enabled. The service control enabling signal SS is combined in gates 268, 270 with control signals COX, COY, respectively, to produce control signals SCX, SCY, respectively, which disable the class-of-service indicators during those time slots. The enabling signal SS is also combined with time slot TS40 via a gate 272 to produce a control signal SC40 which disables the type of call digit during time slot TS40.

The service code control circuit 47 generates the control signals SC37-40 to direct the translation of the four directory digits by the inverted enabling signal SS (transmitted via gate 266) and the enabling of the gates 274 through 282 during the respective time slots TS37-40. The type of call indicator control signal SC51 is generated by a gate 274 and enabled during time slot TS51 by the enabling signal SS. The inverted output of the gate 266 also enables a plurality of gates 284 through 290 at each of the respective time slots TS37-40 to generate the service code time slot enable signal SCTSE. This signal, as mentioned before, enables the flip-flops 208-222 of the output bus circuit 92. The output gates 224-230 (FIG. 6) are enabled by the register bus enable signal SCRBE which is the inversion of the enabling signal SS (transmitted via an output gate 294).

FIG. 8 shows the control signals for a regular code conversion for routing digits in one panel and illustrates a service code translation in the next panel for the route cores 90.

It will be understood by those skilled in the art that numerous variations and modifications may be made in the preferred embodiment without departing from the spirit and scope of the invention as hereinafter claimed.

What is claimed is:

1. In a common control telephone system having dual translation circuits, a method for connecting special service calls comprising the steps of:
   a. dialing an abbreviated service access code from a calling line into one of a plurality of common registers;
   b. storing a class-of-service signal associated with said calling line in said common register;
   c. transferring the access code and class-of-service signal from said common register to a first translation circuit;
   d. decoding the transferred access code and class-of-service signal into a service code signal;
   e. enabling a service control circuit with said service code signal;
   f. translating the access code into a directory number and type of call signal in said first translation circuit under the direction of the enabled service control circuit;
   g. transferring said directory number and type of call signal into storage in said common register and in a second translation circuit;
   h. marking a line circuit corresponding to the directory number under the direction of the second translation circuit, and
   i. connecting the calling line to the marked line circuit which corresponds to the dialed abbreviated service access code.

2. A method as defined in claim 1 wherein the step (f) of translation comprises the steps of:
   energizing a program wire threaded through routing cores of said first translation circuit to correspond to a directory number of said telephone system;
   directing control signals through said routing cores coincidently with said energizing of said program wire at selected time slots to produce output pulses from said cores;

detecting said pulses with core sensors in said first translation circuit, said core sensors being connected to an output bus circuit communicating with said common register, and energizing said output bus circuit during the directing of said control signals to transmit said directory number to said common register.

3. A method as defined in claim 2 further comprising the additional step of:

decoding the transferred class-of-service signal and access code into a plurality of program wire energizing signals wherein each program wire corresponds to a separate directory number.

4. A method as defined in claim 2 wherein the step (f) of translation, further comprising the step of:

producing a type of call signal during the directing of said control signals through said routing cores at a selected time slot and transmitting a type of call signal to said common register coincidentally with said directory numbers.

5. In a common control telephone system having a first translation circuit, arranged to translate dialed directory numbers into equipment numbers and including first circuit means for marking line circuits of connected stations, and a second translation circuit, arranged to translate dialed digits into trunk routing information and including second circuit means for marking trunk circuits, and a plurality of common registers, arranged to be accessed on a time divided basis by a register common circuit means connected to each translation circuit, for receiving dialed digits from subscribers, a service code control circuit comprising:

third circuit means for decoding a service access code dialed into one of said common registers and for generating a service code signal upon the receipt thereof by the second translator circuit;

fourth circuit means, arranged to be enabled by said service code signal for controlling the translation of the service access code into a directory number in said second translation circuit, and fifth circuit means, arranged to be enabled by said service code signal, to transfer said directory number to the same common register from which said service access code was received.

6. A service code control circuit as defined in claim 5 further comprising:

sixth circuit means, arranged to be enabled by said service code signal, to control the translation of the service access code into a type of call signal in said second translation circuit, said fifth circuit means further comprising means for transferring said type of call signal together with said directory number to the same common register from which said service access code was received.

7. A service code control circuit as defined in claim 6 further comprising:

decoding means responsive to the receipt of class-of-service signals, for decoding class-of-service signals transferred from said common register to said second translation circuit, and seventh circuit means for combining decoded class-of-service signals with said service access codes, the fourth circuit means being arranged to translate a plurality of combined codes into a plurality of directory numbers by said fourth circuit means.

8. A service code control circuit as defined in claim 7 wherein said decoding means comprises:

storage means for storing said service access code and class-of-service signals in digit form during selected time slots, individual digits being received from said common register during different time slots;

second decoding means for decoding each of the stored digits into a signal on one of a plurality of output lines each of said output lines corresponding to a different value of a digit, and combining means for logically combining the signals present on said output lines into control signals for enabling transmission of said combined codes and said service code signal.

9. A service code control circuit as defined in claim 8 wherein said combining means includes strapping fields connected to each of said output lines.

10. A service code control circuit as defined in claim 9 wherein said fourth circuit means includes:

gating means for gating time slot signals to a plurality of routing cores located in said second translation circuit with program wires threaded in logical combinations therethrough, the coincidence of a time slot signal and the energization of a program wire producing an output pulse digit;

energizing circuit means for the enabling of said program wires by said combination codes, and eighth circuit means for enabling an output bus in said second translation circuit during said time slot signal, said output bus thereby transmitting said output pulse digits to said common register.

* * * * *